United States Patent [19]
Fujii

[11] Patent Number: 5,839,389
[45] Date of Patent: Nov. 24, 1998

[54] FEEDER FOR PIG-RAISING

[75] Inventor: Kazumi Fujii, Maebashi, Japan

[73] Assignee: Fujii Shokai Co., Ltd., Gunma, Japan

[21] Appl. No.: 752,915

[22] Filed: Nov. 20, 1996

[30] Foreign Application Priority Data

Nov. 22, 1995 [JP] Japan ............................... 7-012394 U
Oct. 3, 1996 [JP] Japan .................................. 8-263223

[51] Int. Cl.$^6$ ................................................. A01K 5/00
[52] U.S. Cl. .............................. 119/53; 119/53.5; 119/54
[58] Field of Search ............................... 119/53, 53.5, 54, 119/61

[56] References Cited

U.S. PATENT DOCUMENTS

| | | | |
|---|---|---|---|
| 2,238,407 | 4/1941 | Webber | 119/53.5 |
| 2,804,844 | 9/1957 | Gigliotti | 119/53 |
| 3,099,980 | 8/1963 | Merkle | 119/53.5 |
| 5,069,164 | 12/1991 | Wiwi | 119/54 X |
| 5,123,379 | 6/1992 | Von Taschitzki | 119/54 X |

FOREIGN PATENT DOCUMENTS 79029 11/1919 Austria ..................................... 119/53
5-39256 5/1993 Japan .

Primary Examiner—Gene Mancene
Assistant Examiner—Yvonne R. Abbott
Attorney, Agent, or Firm—Lowe, Price, LeBlanc & Becker

[57] ABSTRACT

A feeder for pig-raising which can discharge a fixed quantity of food in a good condition at all time, which can adjust a discharge quantity of food relatively simply, and which can feed efficiently at all time in consideration of a habit of pigs. A suspension rod is suspended within a feeding tank formed at a lower end with a food outlet, and a food-quantity adjusting member is disposed below the suspension rod. The food-quantity adjusting member comprises a conical portion having an upper end smaller in diameter than the food outlet of said feeding tank, being gradually enlarged in diameter downward, and a lower end slightly larger in diameter than the food outlet, and a disk-like portion secured to the lower end of said conical portion. Food is supplied to a bottom plate from a gap between the food outlet of the feeding tank and an inclined peripheral surface of the food-quantity adjusting member.

9 Claims, 11 Drawing Sheets

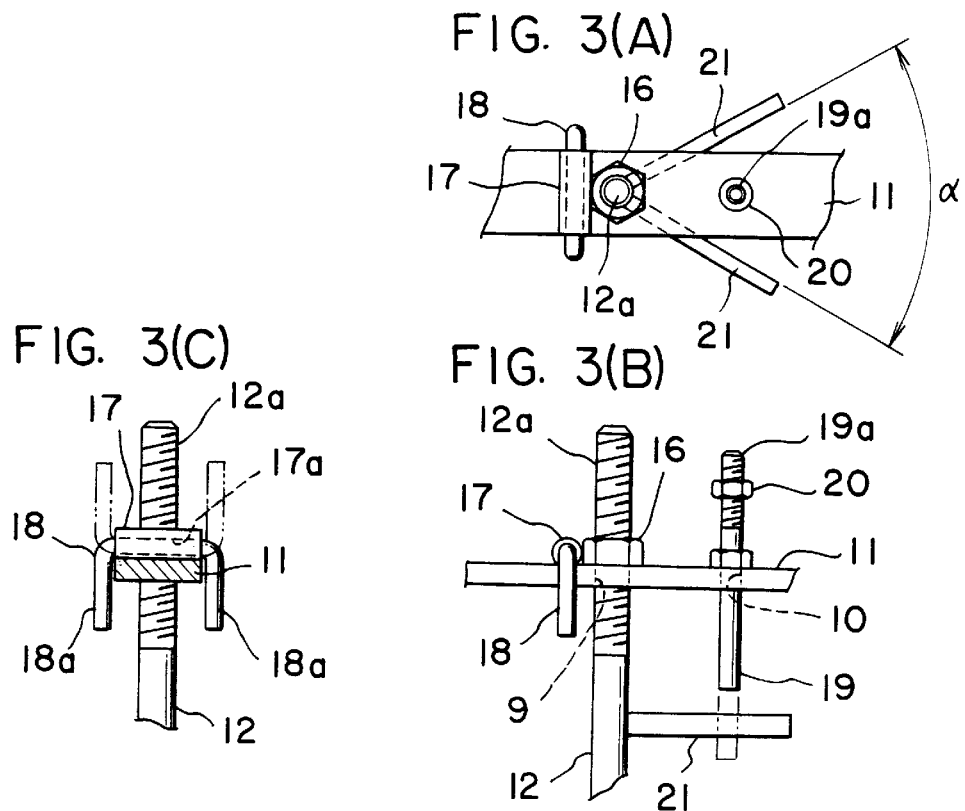
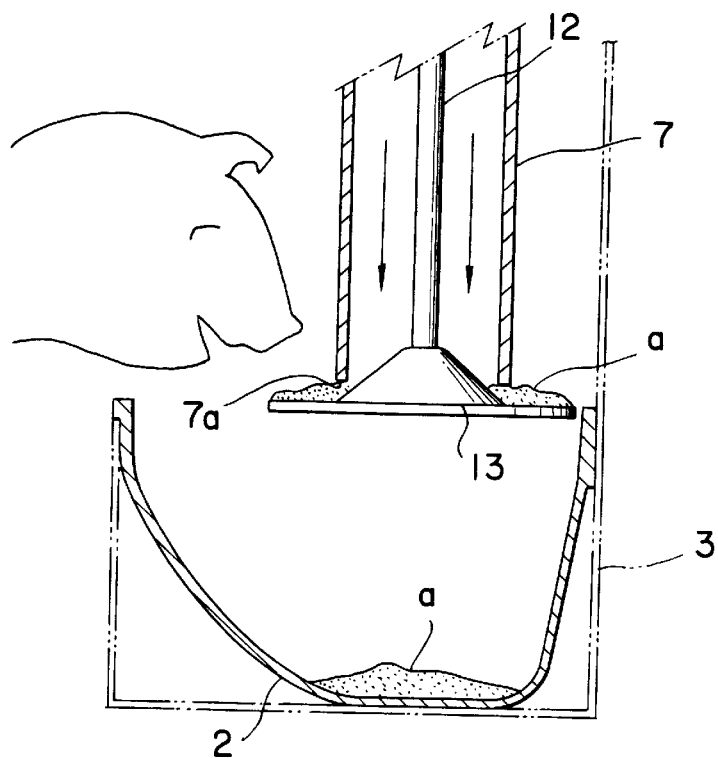

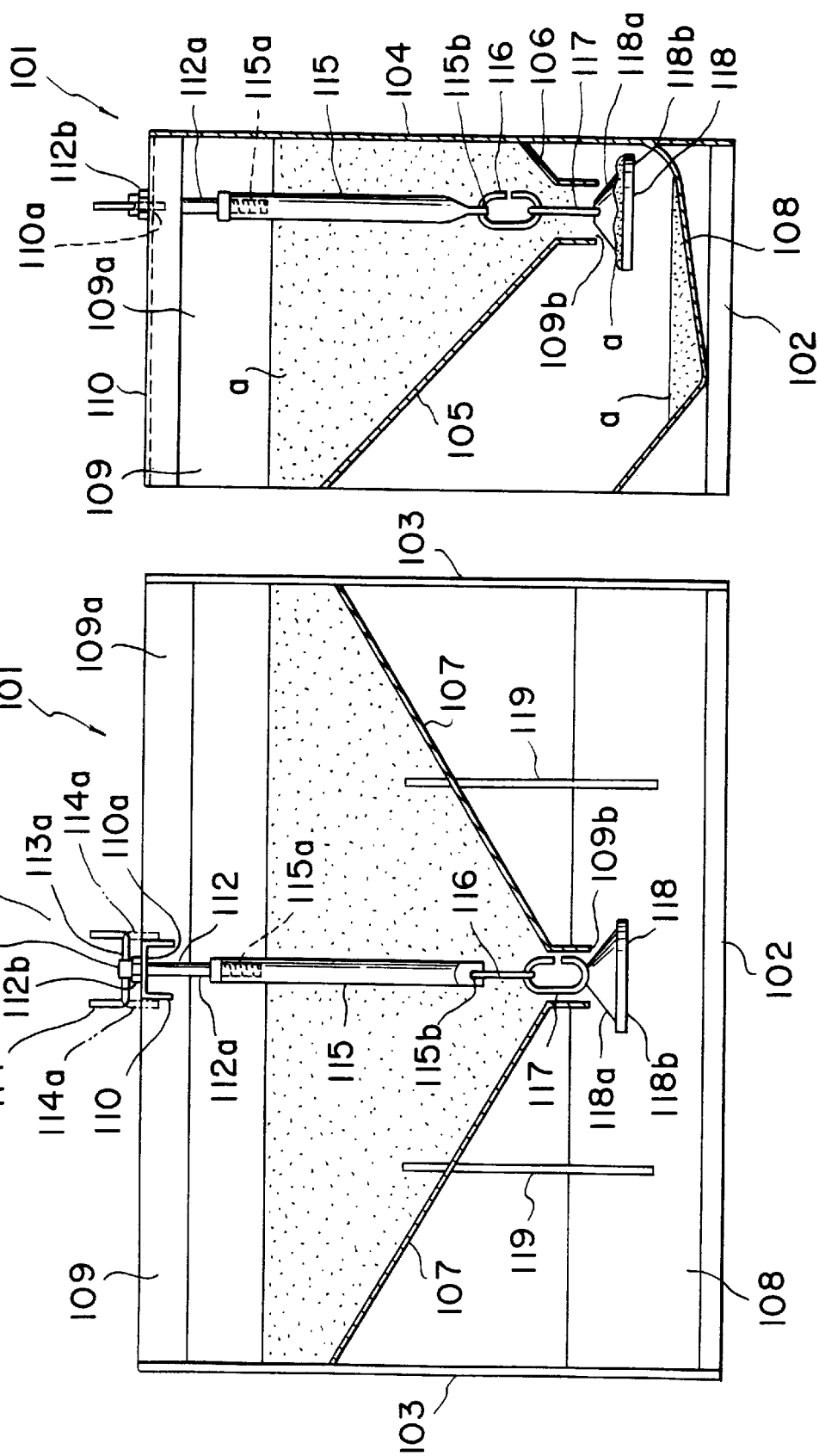

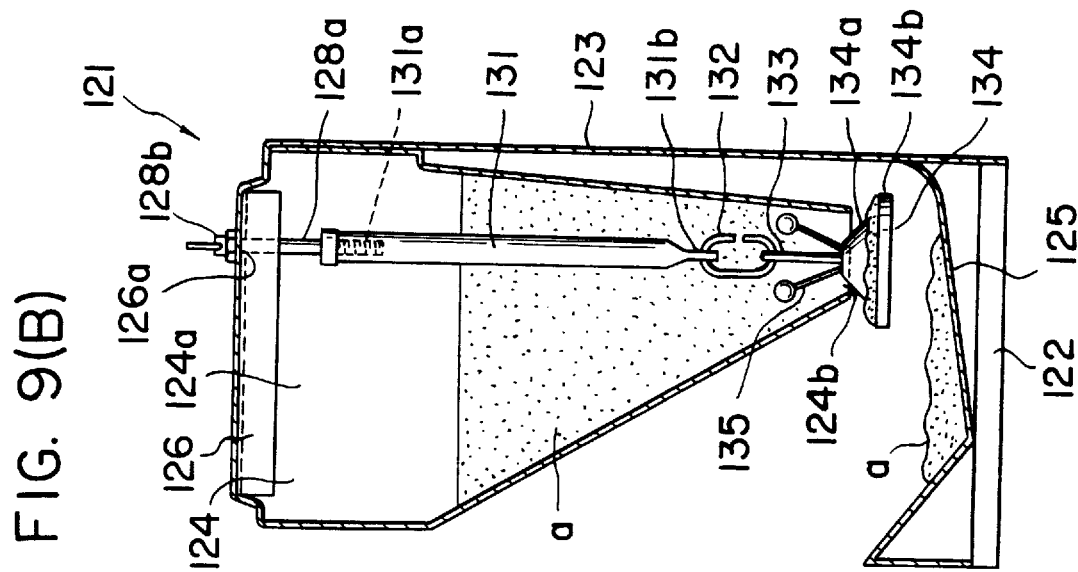
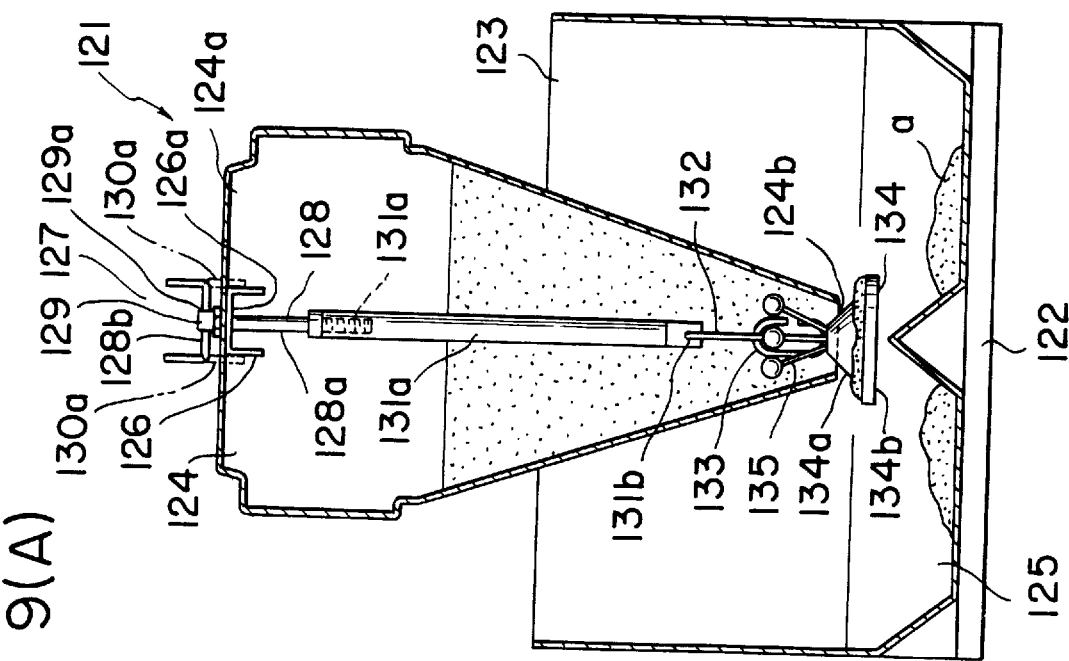

FEEDER FOR PIG-RAISING

BACKGROUND OF THE INVENTION

1. Field of the Invention

The present invention relates to a feeder for pig-raising suitable for feeding pigs.

2. Description of the Prior Art

In any of conventional feeders for pig-raising, a lower portion of a feeding tank is gradually smaller in diameter or narrower in width. Therefore, in an arrangement wherein food is naturally dropped by the gravity, food at the lower portion of the feeding tank tends to be bridge-like so that food is not possibly discharged from a feeding opening at the lower end of the feeding tank.

Further, in an arrangement wherein a stirrer is provided within the feeding tank to promote dropping of food, it is possible to prevent food from being the bridge-like to a considerable degree. However, this requires a power source, and in addition, it is cumbersome to clean the interior of the feeding tank.

In order to overcome such problems as noted above, there has been proposed a feeder for pig-raising 204 provided with a suspension shaft 202, whose upper end is fixed, which is inserted through a feeding tank 201 and whose lower end is projected from a lower end opening 201a of the feeding tank 201, and in which a food receiving plate 203 is rotatably mounted on the lower end of the suspension shaft 202, as shown in FIG. 15 (Japanese Utility Model Laid-Open No. 39256/1993).

According to this feeder for pig-raising 204, the nose or mouth of a pig presses the food receiving plate 203 whereby the suspension shaft 202 swings and the food receiving plate 203 rotates or swings so that food within the feeding tank 201 are stirred not to be bridge-like, and food are smoothly discharged out of the lower end opening 201a of the feeding tank 201 and drop into a bottom plate 205.

However, in the above-described feeder for pig-raising 204, since the food receiving plate 203 is in the form of a flat disk, there is a disadvantage in that food tends to be adhered to the upper surface of the food receiving plate 203 mountainously in a relatively short period of time so that food are not smoothly discharged out of the lower end opening 201a of the feeding tank 201. Therefore, the food receiving plate 203 and the lower end of the feeding tank 201 have to be cleaned frequently.

Further, food is delivered horizontally by rotation or swinging of the food receiving plate 203 after the food have been dropped vertically from the lower end opening 201a of the feeding tank 201 onto the upper surface of the food receiving plate 203. Food tend to become clogged at the lower end opening 201a and to drip, making it difficult to well discharge food in a fixed quantity at all time.

Further, feeding a pig is done at the bottom plate 205. However, the pig has a habit to look for food with the sense of smell. Therefore, when food is gone within the bottom plate 205, the pig merely wanders its nose or mouth about the inner surface of the bottom plate 205 and presses it and does not sometimes try to press the food receiving plate 203 to discharge food from the feeding tank 201. In such a case, efficient feeding could not be carried out.

SUMMARY OF THE INVENTION

It is an object of the present invention to provide a feeder for pig-raising which prevents food from being difficult to be discharged from a lower end opening of a feeding tank in a short period of time, which eliminates the necessity of frequently cleaning the lower end of the feeding tank and the like, and which smoothly discharges food from the lower end opening of the feeding tank so as to well discharge food in a fixed quantity at all time.

It is a further object of the present invention to provide a feeder for pig-raising which can adjust a discharge quantity of food relatively simply so as to fully correspond to the fluidity, which can carry out feeding efficiently at all time in consideration of a habit of a pig, and which is simple in construction and low in price.

For achieving the aforementioned objects, according to the present invention, there is provided a feeder for pig-raising characterized in that a suspension rod is suspended within a feeding tank, a food-quantity adjusting member is disposed below the suspension rod, said food-quantity adjusting member having a disk-like portion secured to a lower end of a conical portion having an upper end smaller in diameter than a food outlet of the feeding tank, gradually enlarging a diameter downward, and having a lower end slightly larger in diameter than the food outlet, and food is supplied to a bottom plate portion from a gap between the food outlet of the feeding tank and an inclined peripheral surface of the food-quantity adjusting member.

BRIEF DESCRIPTION OF THE DRAWINGS

FIG. 3(A), 3(B) and 3(C) are a plan view, a front view and a side sectional view, respectively, in the vicinity of a mounting portion of a suspension rod of the feeder for pig-raising shown in FIG. 1.

FIG. 4 is an explanatory view for the using state of the feeder for pig-raising shown in FIG. 1.

FIGS. 5(A) and 5(B) show another embodiment of the feeder for pig-raising according to the present invention, FIG. 5(A) being a longitudinal sectional front view, and FIG. 1(B) being a longitudinal sectional side view.

FIGS. 9(A) and 9(B) show still another embodiment of the feeder for pig-raising according to the present invention, FIG. 9(A) being a longitudinal sectional front view, and FIG. 9(B) being a longitudinal sectional side view.

DETAILED DESCRIPTION OF THE INVENTION

Figure 1A:
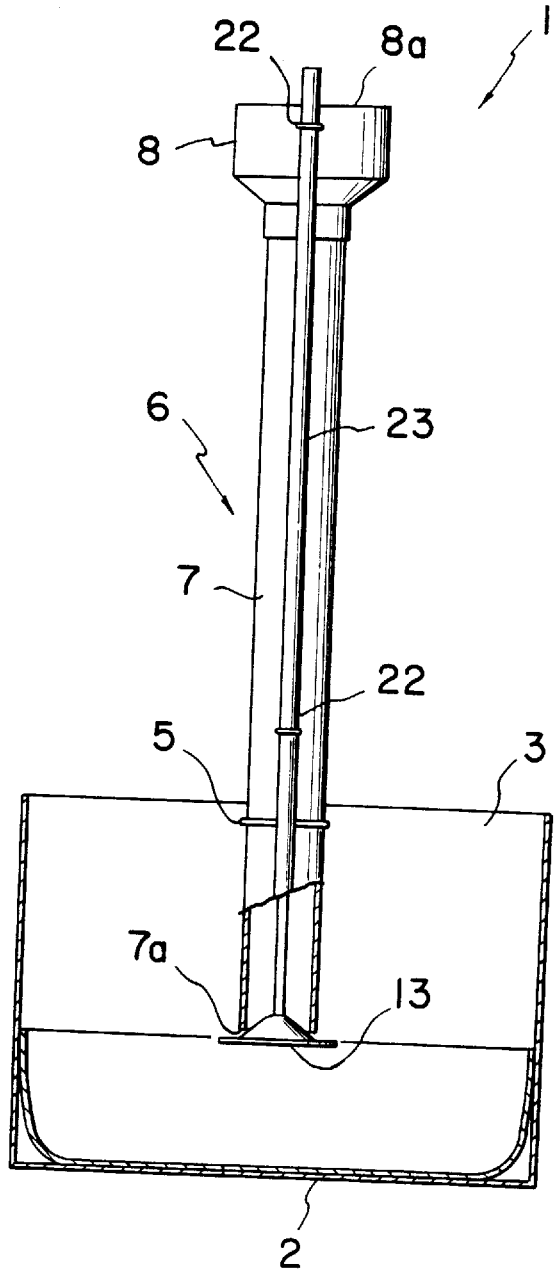
FIGS. 1(A) and 1(B) show one embodiment of the feeder for pig-raising according to the present invention, FIG. 1(A) being a partly cutaway front view, and FIG. 1(B) being a partly cutaway side view.

The embodiments of the feeder for pig-raising according to the present invention will be described in detail hereinafter.

In a feeder for pig-raising 1 according to the present invention, a cover 3 is erected with a lower end of the cover 3 secured to an outer peripheral surface of a bottom plate 2, and a feeding tank 6 is vertically held with the lower portion of the feeding tank 6 fixed by means of support members 4 and mounting members 5 provided on the upper end and the intermediate portion of the cover 3.

Figure 1B:
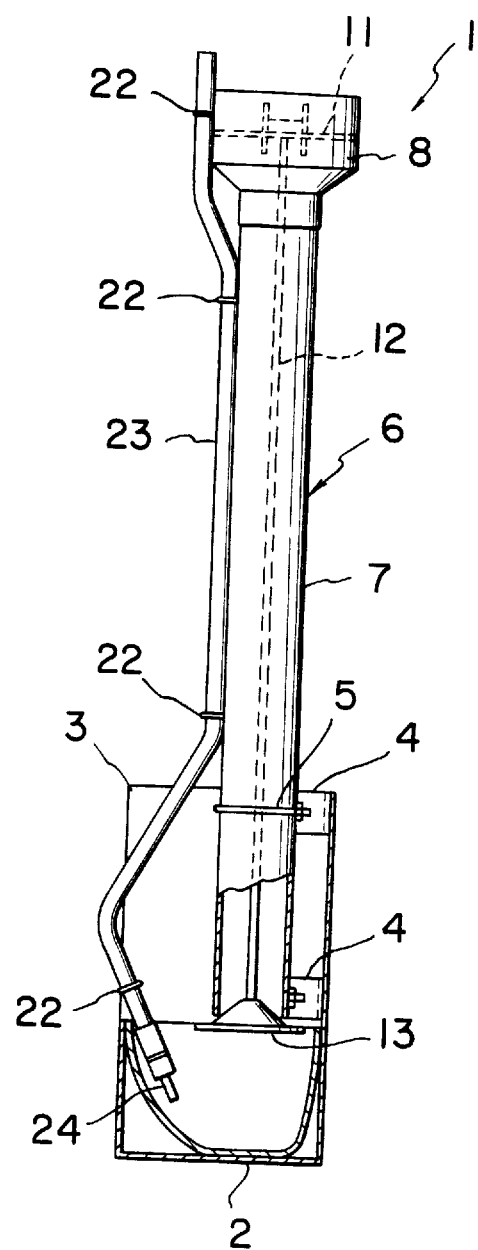

As shown in FIG. 1, the feeding tank 6 is constructed such that the lower end of a short bowl-pipe like body 8 is secured to the upper end of a long circular tubular body 7 by welding or the like, the lower end opening of the circular tubular body 7 being a food outlet 7a, the upper end opening of the bowl-pipe like body being a food inlet 8a.

A support member 11 bored with insert holes 9 and 10 in the central portion and the intermediate portion is mounted on the bowl-pipe like body 8.

Figure 2:
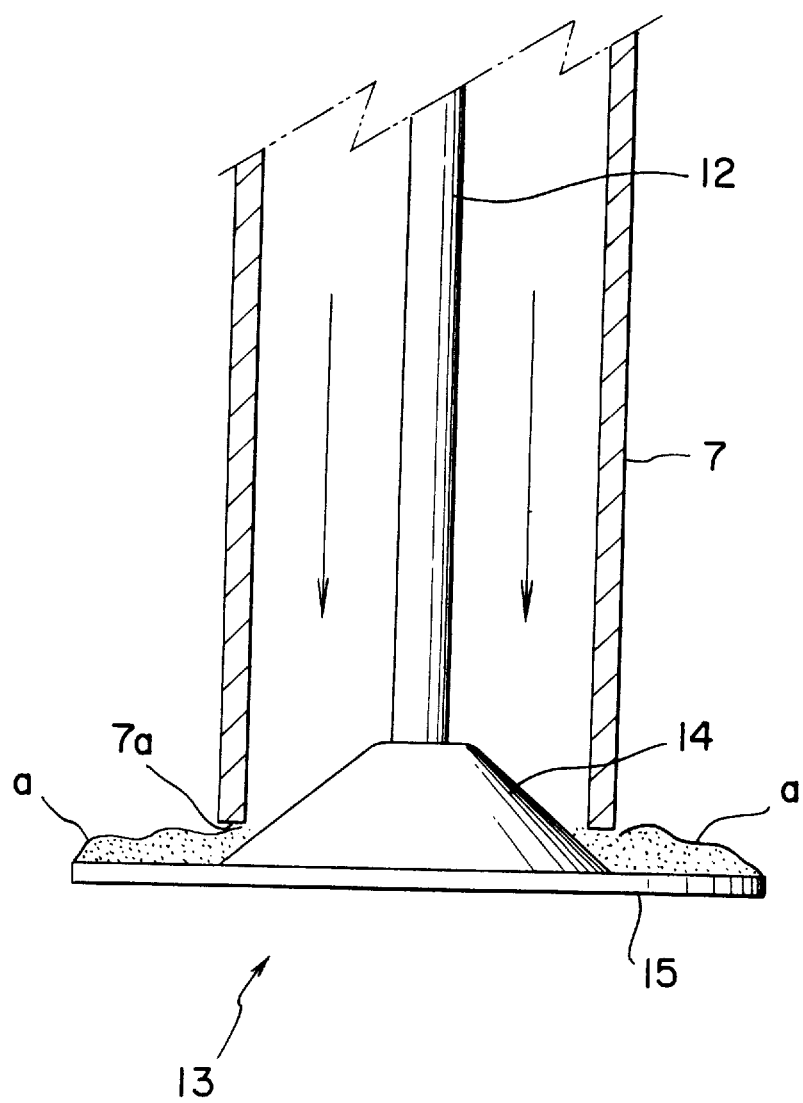
FIG. 2 is a longitudinal sectional view in the vicinity of a food outlet of a feeding tank of the feeder for pig-raising shown in FIG. 1.

A suspension rod 12 is constructed such that a male thread portion 12a is formed in the upper end, and a food-quantity adjusting member 13 is secured to the lower end, as shown in FIGS. 1 to 3.

The food-quantity adjusting member 13 is constructed such that a disk-like portion 15 is secured to a lower end of a conical portion 14, as shown in FIG. 2. The conical portion 14 is constructed such that the upper end is smaller in diameter than the food outlet 7a of the circular tubular body 7, gradually enlarging in diameter downward, and the lower end is slightly larger in diameter than the food outlet 7a of the circular tubular body 7. The disk-like portion 15 is larger in diameter than the lower end of the conical portion 14.

As shown in FIG. 3, the male thread portion 12a of the suspension rod 12 is inserted into the insert hole 9, and a nut 16 is threadedly engaged therewith, the suspension rod 12 being suspended on the support member 11 swingingly and rotatably.

The outer peripheral surface of a pipe member 17 having substantially the same length as the width of the support member 11 is secured to one side of the nut 16 by welding or the like, and a ]-shaped rotation preventive member 18 with opposite ends formed to have bend portions 18a is inserted into an insert hole 17a of the pipe member 17, the bend portions 18a being located on the side of the support member 11 to prevent the nut 16 from being freely rotated.

As shown in FIG. 3, a stop pin 19 having a male thread portion 19a at the upper end threadedly engaged with a nut 20 is inserted into the insert hole 10, and two contact pins 21 and 21 are secured to the upper outer peripheral surface of the suspension rod 12 at a fixed angle α in a horizontal direction.

Accordingly, the suspension rod 12 can be rotated by the angle range of α at which the two contact pins 21 and 21 come in contact with the stop pin 19. Preferably, the fixed angle α is about 60 degrees.

Further, as shown in FIG. 1, a water pipe 23 is fixed along the feeding tank 6 by means of mounting members 22, 22, . . . in front of the feeding tank 6, and a faucet 24 is secured to the lower end of the water pipe 23 so that water can be supplied into the bottom plate 2.

The feeder for pig-raising 1 according to the present invention is constructed as described above. As shown in FIG. 4, food a within the feeding tank 6 flows along the inclined peripheral surface of the conical portion 14, is smoothly discharged from a gap between the food outlet 7a of the circulartubular body 7 and the inclined peripheral surface of the conical portion 14, and is loaded in a suitable quantity on the disk-like portion 15.

When the pig thrusts its nose or mouth into the bottom plate 2 and presses its nose or mouth against the disk-like portion 15 of the food-quantity adjusting member 13 to apply a force, the suspension rod 12 swings and the conical portion 14 of the food-quantity adjusting member 13 swings in all directions and rotates. Accordingly, the food a within the feeding tank 6 is smoothly discharged and is loaded in a suitable quantity on the disk-like portion 15 and drops into the bottom plate 2.

The feeding tank 6 comprises the circular tubular body 7, the suspension rod 12 swings and the conical portion 14 of the food-quantity adjusting member 13 swings in all directions and rotates whereby the food a within the feeding tank is stirred so that the food a within the feeding tank 6 will not be bridge-like.

Further, since the conical portion 14 of the food-quantity adjusting member 13 is gradually enlarged in diameter downward, the food a within the feeding tank 6 flows along the inclined peripheral surface of the conical portion 14, and is smoothly discharged from the gap between the food outlet 7a of the circular tubular body 7 and the inclined peripheral surface of the conical portion 14.

Feeding is carried out at the disk-like portion 15 and the bottom plate 2. When the food a on the disk-like portion 15 reduces, the food a within the feeding tank 6 is successively discharged by its own weight and is loaded in a suitable quantity on the disk-like portion 15.

When the food a on the disk-like portion 15 or within the bottom plate 2 is gone, the pig looks for the food a on the disk-like portion 15 with the sense of smell, and therefore the pig presses its nose or mouth against the disk-like portion 15 to let the food a discharge from the feeding tank 6.

If the stop pin 19 is moved upward to prevent the contact pins 21 and 21 from contacting the stop pin 19 and the bend portion 18a of the rotation preventive member 18 is rotated upward to release the engagement with the support member 11, the suspension rod 12 can be moved up and down by rotation of the nut 6, and the gap between the food outlet 7a of the circular tubular body 7 and the inclined peripheral surface of the conical portion 14 can be suitably set to adjust the quantity of supply of the food a to the bottom plate 2.

Since the discharge flow rate of the food a from the gap between the food outlet 7a of the circular tubular body 7 and the inclined peripheral surface of the conical portion 14 is reduced due to the pressure of the food a loaded in a suitable quantity on the disk-like portion 15, the discharge quantity of the food a can be adjusted relatively simply without making a fine adjustment so much irrespective of the magnitude of the fluidity of the food a.

According to the feeder for pig-raising 1 of the present invention, a number of the feeders for pig-raising 1 can be juxtaposed by connecting the upper end of the bowl-pipe like body 8 of the feeding tank 6 to a feed supply pipeline. Therefore, it is suitable for raising a number of pigs.

Moreover, since the water pipe 23 is fixed along the feeding tank 6 to the front of the feeding tank 6, the water pipe 23 serves as a partitioning plate as well as a reinforcing column, and the feeder for pig-raising 1 is extremely simple in construction and less cost.

In the feeder for pig-raising 1 according to the present invention, the feeding tank comprises the circular tubular body. The suspension rod swings, and the conical portion of the food-quantity adjusting member swings in all directions and rotates whereby the food within the feeding tank is stirred so that the food within the feeding tank will not be bridge-like.

Since the conical portion of the food-quantity adjusting member is gradually enlarged in diameter downward, the food within the feeding tank flows along the inclined peripheral surface of the conical portion, and is smoothly discharged from the gap between the food outlet of the feeding tank and the inclined peripheral surface of the conical portion.

Accordingly, the discharge of food will not be out of order in a short period of time. Further, no food becomes clogged at the food outlet and drips. The food can be discharged in a good condition at all time.

Feeding is carried out at the disk-like portion and the bottom plate. As the food on the disk-like portion reduces, the food within the feeding tank 6 is successively discharged by its own weight. When the food on the disk-like portion or within the bottom plate is gone, the pig looks for the food on the disk-like portion with the sense of smell, and therefore the pig presses its nose or mouth against the disk-like portion to let the food discharge from the feeding tank, thus enabling efficient feeding at all time.

Since the discharge flow rate of the food from the gap between the food outlet of the circular tubular body and the inclined peripheral surface of the conical portion is reduced due to the pressure of the food loaded in a suitable quantity on the disk-like portion, the discharge quantity of the food a can be adjusted relatively simply without making a fine adjustment.

The feeder for pig-raising 1 according to the present invention requires no special members except the suspension rod and the food-quantity adjusting member and is extremely simple in construction, and therefore is less cost and failure or trouble thereof is hard to occur.

Further, since a number of feeder for pig-raising can be juxtaposed by connecting the upper end of the feeding tank to the feed supply pipeline, it is suitable for raising a number of pigs.

In a feeder for pig-raising 101 according to the present invention shown in FIG. 5, side walls 103, 103 are erected from opposite side ends of a base 102, a rear wall 104 is erected from a rear end of a base 102, a front wall 105, an inclined rear wall 106, and inclined side walls 107, 107 are provided between the opposite side walls 103, 103, and a bottom plate 108 is provided while connecting to the lower end of the rear wall 104.

A feeding tank 109 is defined by the front wall 105, the rear wall 104, the inclined rear wall 106, the side walls 103, 103, and the inclined side walls 107, 107. The spacing between the front wall 105 and the rear wall 104 or the inclined rear wall 106, and the spacing between the inclined side walls 107 and 107 are gradually reduced downward.

The upper end opening of the feeding tank 109 serves as a food inlet 109a, and the lower end opening thereof serves as a food outlet 109b.

A support member 110 is mounted between the upper end central portion of the front wall 105 and the upper end central portion of the rear wall 104. An insert hole 110a is bored at a suitable position of the support member 110, into which is inserted a male thread portion 112a of a position adjusting member 111.

In the position adjusting member 111, a peripheral wall surface of a circular pipe 113 is secured to a head 112b of a bolt 112 formed with a male thread portion 112a, and a ]-shaped bent shaft 114 formed with bend ends 114a, 114a is inserted into a through-hole 113a of the circular pipe 113.

The bent shaft 114 has its both bend ends 114a placed in contact with both sides of the support member 110 whereby to inhibit the rotation of the position adjusting member 111.

The male thread portion 112a of the position adjusting member 111 is threadedly engaged with a female thread portion 115a formed in the upper end of a suspension rod 115, the upper end of an O-shaped ring 116 is stopped at a stop hole 115b formed at the lower end of the suspension rod 115, and the upper end of a ring 117 of the same shape as the former is stopped at the lower end of the ring 116.

The lower end of the ring 117 is secured to the upper end of a food-quantity adjusting member 118 by welding or the like. However, the ring 117 is not necessarily secured to the food-quantity adjusting member 118 but may be merely connected.

Figure 6:
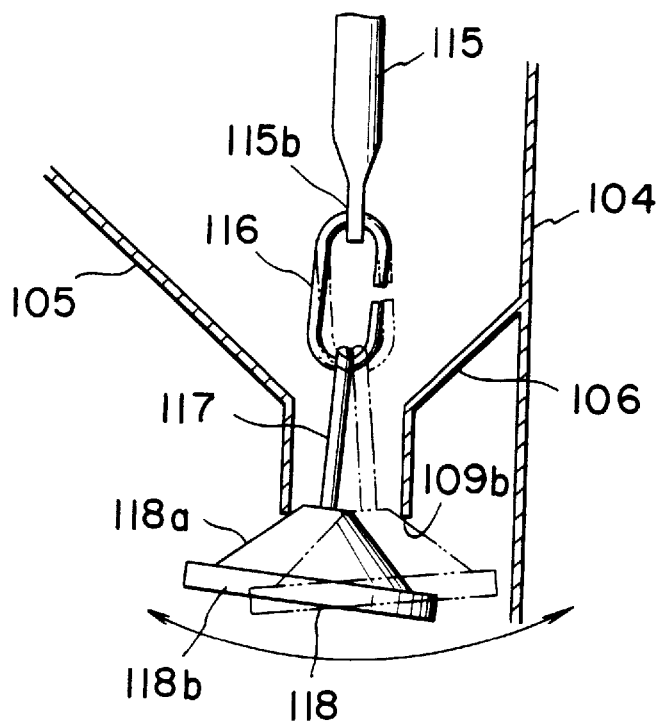
FIG. 6 is an explanatory view for the operation of a food-quantity adjusting member of the feeder for pig-raising shown in FIG. 5.
Figure 7:
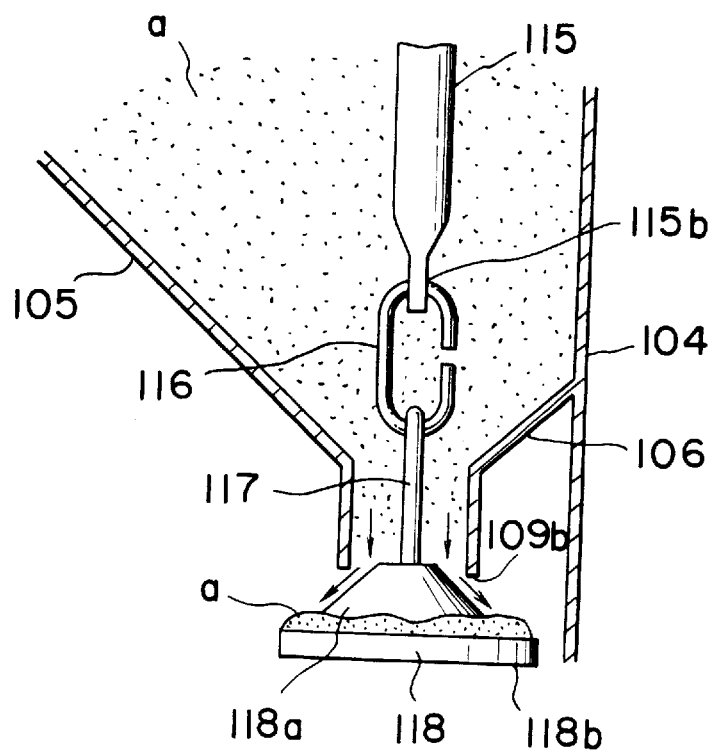
FIG. 7 is a longitudinal sectional view in the vicinity of a food outlet of a feeding tank of the feeder for pig-raising shown in FIG. 5.

The food-quantity adjusting member 118 is constructed such that as shown in FIGS. 5 to 7, a disk-like portion 118b is secured to the lower end of a conical portion 118a. The upper end of the conical portion 118a is smaller in diameter than the food outlet 109b, is gradually enlarged in diameter downward, and the lower end thereof is slightly larger in diameter than the food outlet 109b.

As shown in FIG. 5, partitioning plates 119, 119 whose rear ends are secured to the rear wall 104 are provided at suitable positions between the opposite side walls 103, 103.

The feeder for pig-raising 101 according to the present invention is constructed as described above. As shown in FIG. 7, food a within the feeding tank 109 flows along the inclined peripheral surface of the conical portion 118a of the food-quantity adjusting member 118, is smoothly discharged from a gap between the food outlet 109b and the inclined peripheral surface of the conical portion 118a, and is loaded in a suitable quantity on the disk-like portion 118b.

Figure 8:
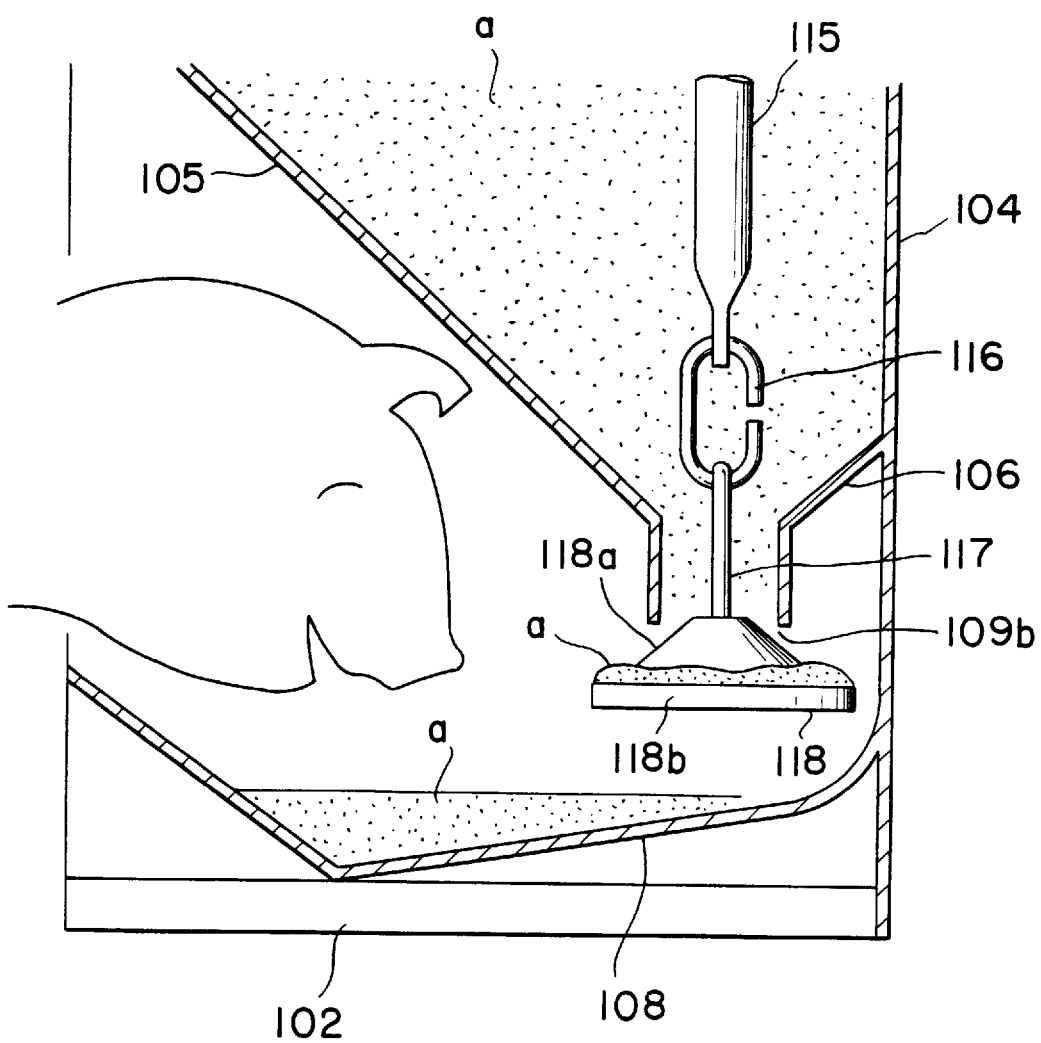
FIG. 8 is an explanatory view for the using state of the feeder for pig-raising shown in FIG. 5.

When the pig thrusts its nose or mouth into the bottom plate 108 and presses its nose or mouth against the disk-like portion 118b of the food-quantity adjusting member 118 to apply a force, as shown in FIG. 8, the food-quantity adjusting member 118 swings in all directions and rotates. Accordingly,the food a within the feeding tank 109 is smoothly discharged and is loaded in a suitable quantity on the disk-like portion 118b and drops into the bottom plate 108.

The food-quantity adjusting member 118 swings in all directions and rotates and the rings 116 and 117 also swing in all directions and rotate to stir the food a in the feeding tank 109, and therefore, the food a within the feeding tank 109 will not be bridge-like.

Feeding is carried out at the disk-like portion 118b of the food-quantity adjusting member 118 and the bottom plate 108. As the food a on the disk-like portion 118b reduces, the food a within the feeding tank 109 is successively discharged by its own weight and is loaded in a suitable quantity on the disk-like portion 118*b*.

When the food a on the disk-like portion 118*b* or within the bottom plate 108 is gone, the pig looks for the food a on the disk-like portion 118*b* with the sense of smell, and therefore the pig presses its nose or mouth against the disk-like portion 118*b* to apply the force to let the food a discharge from the feeding tank 109.

Both the bend ends 114*a* of the bent shaft 114 of the position adjusting member 111 are rotated upward to be moved away from both sides of the support member 110, and if the position adjusting member 111 is rotated, the suspension rod 115 can be moved up and down. In this manner, the size of the spacing between the food outlet 109*b* and the inclined peripheral surface of the conical portion 118*a* can be suitably set to adjust the discharge quantity of the food a to the bottom plate 108.

Since the discharge flow rate of the food a from the gap between the food outlet 109*b* and the inclined peripheral surface of the conical portion 118*b* decreases due to the pressure of the food a stacked in a suitable quantity on the disk-like portion 118*b*, the discharge quantity of the food a can be adjusted relatively simply without making a fine adjustment so much irrespective of the magnitude of fluidity of the food a.

In the feeder for pig-raising 101 shown in FIG. 5, in the case where the food is granular, a fixed quantity of food can be discharged in a good condition at all time without clogging or dripping the food at the food outlet 109*b*, as described above. However, in the case where the food is powdery, it is not possible to completely prevent the food from being bridge-like within the feeding tank 109.

Therefore, in the case where the food is powdery, the condition is improved if a feeder for pig-raising 121 shown in FIG. 9 is used.

In the feeder for pig-raising 121, a rear wall 123 is erected from the rear end of a base 122, the upper end of a feeding tank 124 is secured to the upper end of the rear wall 123, and a bottom plate 125 is provided while being connected to the lower end of the rear wall 123.

The feeding tank 124 has an upper half portion formed into a tubular shape, a conical portion formed to be gradually reduced in diameter from an intermediate portion to a lower end portion, an upper end opening constituting a food inlet 124*a*, and a lower end opening constituting a food outlet 124*b*. A support member 126 is mounted between the upper end front portion and the upper end rear portion of the feeding tank 124, and a male thread portion 128*a* of a position adjusting member 127 is inserted into an insert hole 126*a* bored at a suitable position of the support member 126.

The position adjusting member 127 is constructed such that a peripheral wall surface of a circular pipe 129 is secured to a head 128*b* of a bolt 128 formed with the male thread portion 128*a*, and a ]-shaped bent shaft 130 formed with bend ends 130a is inserted into a through-hole 129*a* of the circular pipe 129.

The bent shaft 130 has its both bend ends 130*a* placed in contact with both sides of the support member 126 whereby to inhibit the rotation of the position adjusting member 127.

The male thread portion 128*a* of the position adjusting member 127 is threadedly engaged with a female thread portion 131*a* formed in the upper end of a suspension rod 131, the upper end of an O-shaped ring 132 is stopped at a stop hole 131*b* formed at the lower end of the suspension rod 131, and the upper end of a ring 133 of the same shape as the former is stopped at the lower end of the ring 132.

The lower end of the ring 133 is secured to the upper end of a food-quantity adjusting member 134 by welding or the like. However, the ring 133 is not necessarily secured to the food-quantity adjusting member 134 but may be merely connected.

Figure 10A:
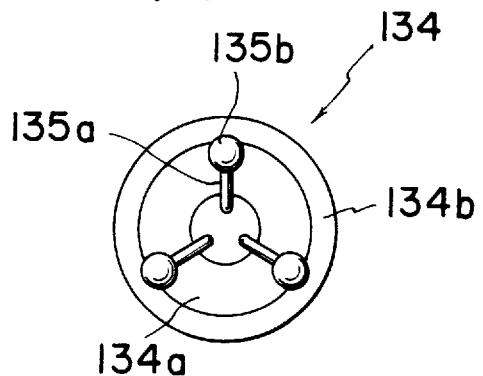
FIGS. 10(A) and 10(B) are a plan view and a front view of the food-quantity adjusting member of the feeder for pig-raising shown in FIG. 9.
Figure 10B:
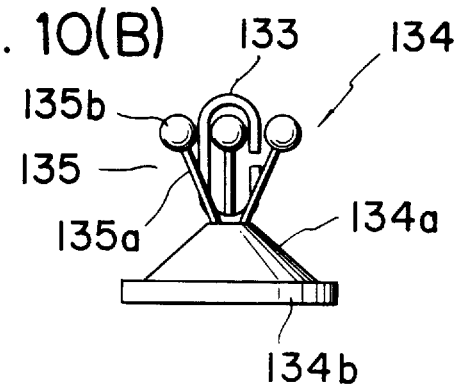

The food-quantity adjusting member 134 is constructed such that as shown in FIGS. 9 to 10, a disk-like portion 134*b* is secured to the lower end of a conical portion 134*a*. The upper end of the conical portion 134*a* is smaller in diameter than the food outlet 124*b*, is gradually enlarged in diameter downward, and the lower end thereof is slightly larger in diameter than the food outlet 124*b*. The disk-like portion 134*b* is larger in diameter than the lower end of the conical portion 134*a*.

A plurality of impact members 135 having a spherical impact body 135*b* fixed to the extreme end of a support rod 135*a* are erected on the upper end of the conical portion 134*a*.

The feeder for pig-raising 121 according to the present invention is constructed as described above. The food a within the feeding tank 124 flows along the inclined peripheral surface of the conical portion 134*a* of the food-quantity adjusting member 134, is smoothly discharged from a gap between the food outlet 124*b* and the inclined peripheral surface of the conical portion 134*a*, and is loaded in a suitable quantity on the disk-like portion 134*b*.

Figure 11:
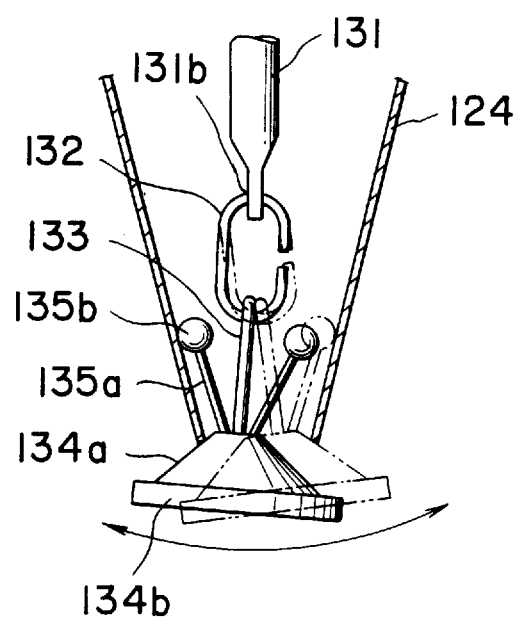
FIG. 11 is an explanatory view for the operation of a food-quantity adjusting member of the feeder for pig-raising shown in FIG. 9.

When the pig thrusts its nose or mouth into the bottom plate 125 and presses its nose or mouth against the disk-like portion 134*b* of the food-quantity adjusting member 134 to apply a force, as shown in FIG. 11, the food-quantity adjusting member 134 swings in all directions and rotates. Accordingly, the food a within the feeding tank 124 is smoothly discharged and is loaded in a suitable quantity on the disk-like portion 134*b* and drops into the bottom plate 125.

The food-quantity adjusting member 134 swings in all directions and rotates and the rings 132, 133 and the impact members 135, 135, 135 also swing in all directions and rotate to stir the food a in the feeding tank 124. Further, the impact bodies 135*b*, 135*b*, 135*b* impact the inner wall surface of the feeding tank 124 to vibrate the feeding tank 124. Accordingly, even if the food a is powdery, it will not be bridge-like.

Other operations and effects of the food-quantity adjusting member 134 and those of the position adjusting member 127 are similar to those of the feeder for pig-raising 101 shown in FIG. 5.

Figure 12A:
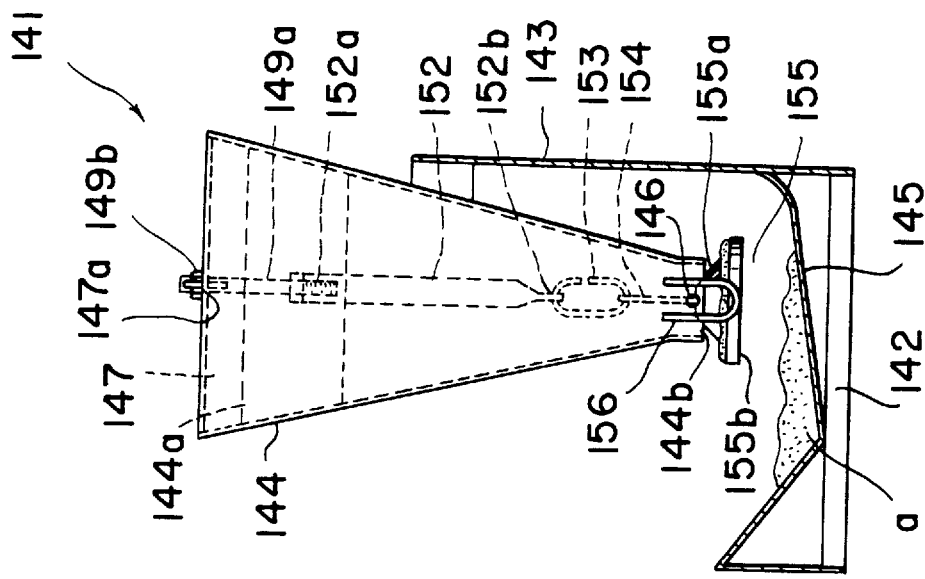
FIGS. 12(A) and 12(B) show another embodiment of the feeder for pig-raising according to the present invention, FIG. 12(A) being a longitudinal sectional front view, and FIG. 12(B) being a longitudinal sectional side view.
Figure 12B:
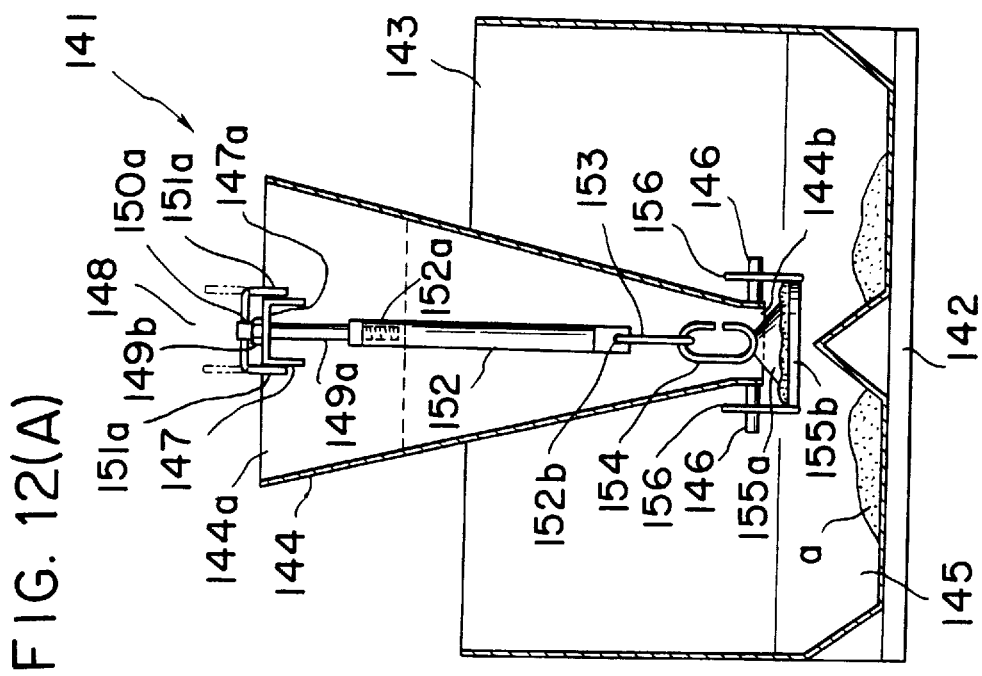

In the case where food is powdery, in order to vibrate the feeding tank more efficiently and to discharge the food a more smoothly, a feeder for pig-raising 141 shown in FIG. 12 is preferably used.

In the feeder for pig-raising 141, a rear wall 143 is erected from the rear end of a base 142, the intermediate portion of a feeding tank 144 is secured to the upper end of the rear wall 143, and a bottom plate 145 is provided while being connected to the lower end of the rear wall 143, as shown in FIG. 12.

The feeding tank 144 is formed into a conical body gradually reduced in diameter from an upper end to a lower end portion, an upper end opening constituting a food inlet 144*a*, and a lower end opening constituting a food outlet 144*b*.

Abutment pins 146, 146 are opposedly projected on the outer peripheral surface at the lower end of the feeding tank 144.

A support member 147 is mounted between the upper end front portion and the upper end rear portion of the feeding tank 144, and a male thread portion 149a of a position adjusting member 148 is inserted into an insert hole 147a bored at a suitable position of the support member 147.

The position adjusting member 148 is constructed such that a peripheral wall surface of a circular pipe 150 is secured to a head 149b of a bolt 149 formed with the male thread portion 149a, and a ]-shaped bent shaft 151 formed with bend ends 151a, 151a is inserted into a through-hole 150a of the circular pipe 150.

The bent shaft 151 has its both bend ends 151a placed in contact with both sides of the support member 147 whereby to inhibit the rotation of the position adjusting member 148.

The male thread portion 149a of the position adjusting member 148 is threadedly engaged with a female thread portion 152a formed in the upper end of a suspension rod 152, the upper end of an O-shaped ring 153 is stopped at a stop hole 152b formed at the lower end of the suspension rod 152, and the upper end of a ring 154 of the same shape as the former is stopped at the lower end of the ring 153.

The lower end of the ring 154 is secured to the upper end of a food-quantity adjusting member 155 by welding or the like. However, the ring 154 is not necessarily secured to the food-quantity adjusting member 155 but may be merely connected.

Figure 13A:
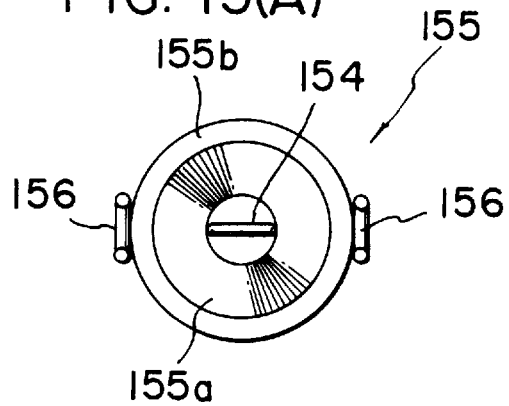
FIGS. 13(A), 13(B), and 13(C) are a plan view, a front view, and a side view, respectively, of the food-quantity adjusting member of the feeder for pig-raising shown in FIG. 12.
Figure 13B:
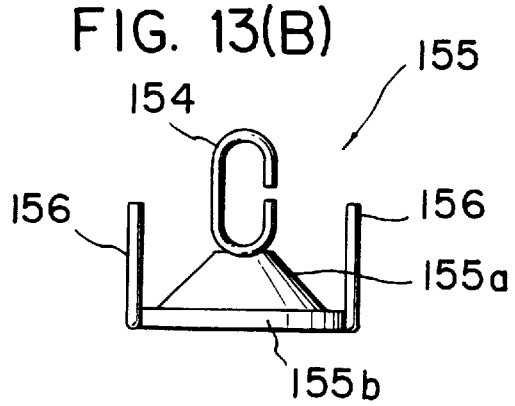
Figure 13C:
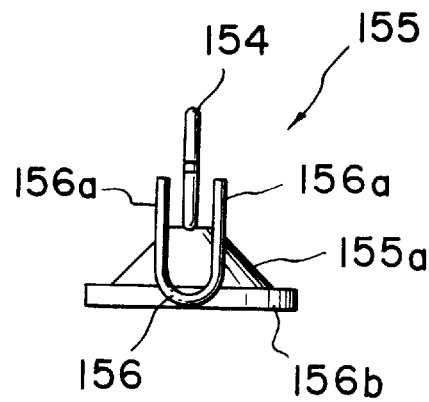
Figure 14:
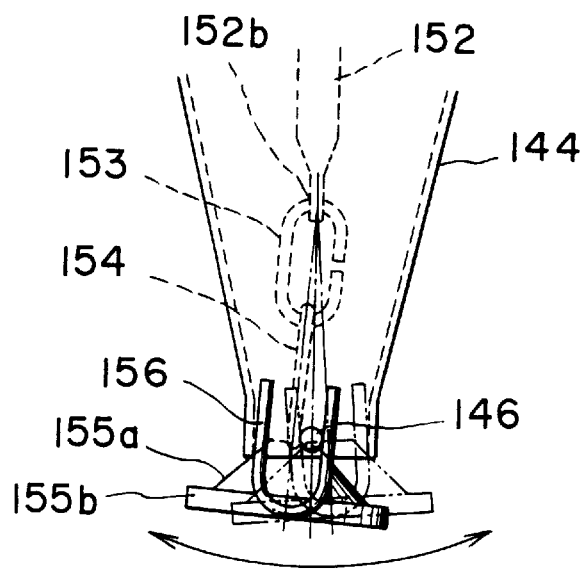
FIG. 14 is an explanatory view for the operation of a food-quantity adjusting member of the feeder for pig-raising shown in FIG. 12.
Figure 15:
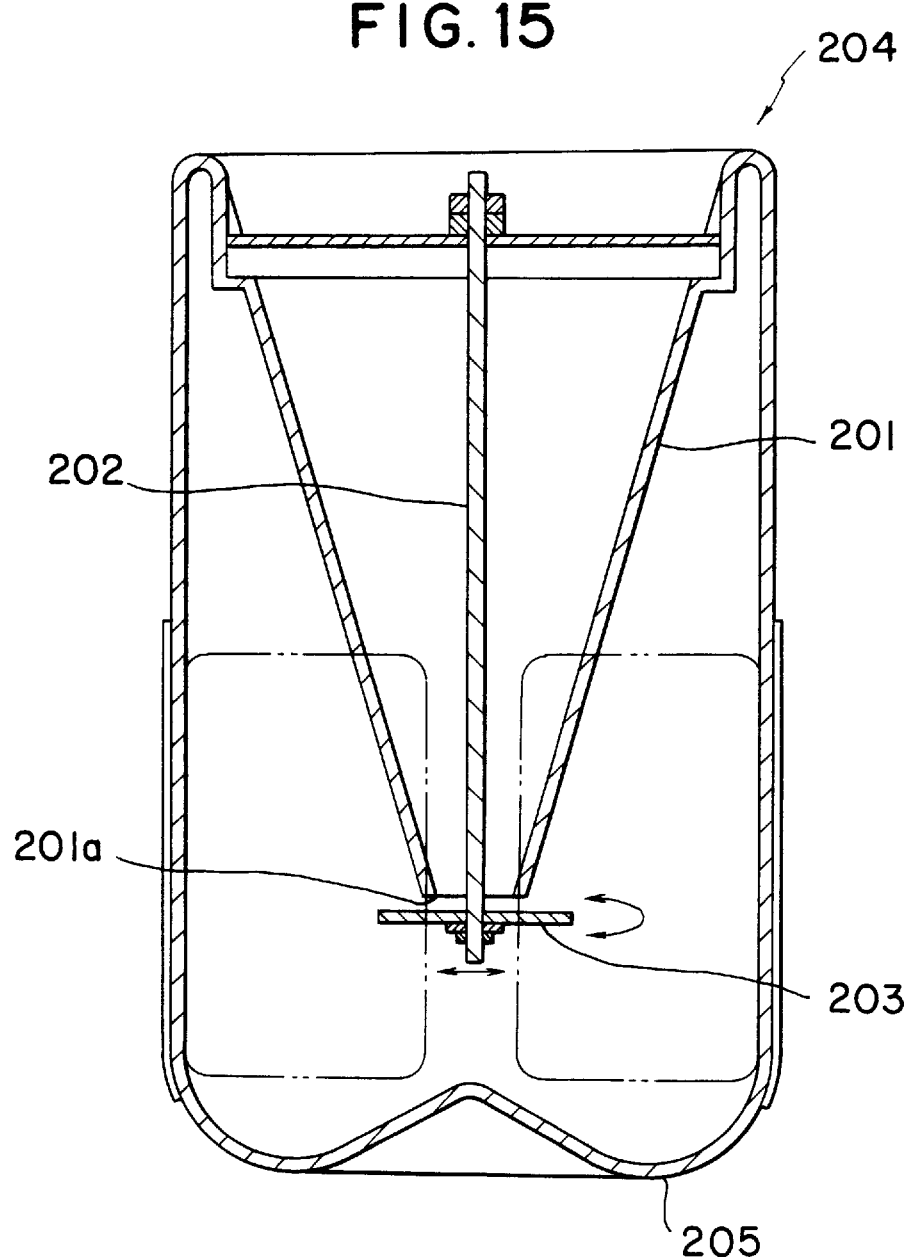
FIG. 15 is a longitudinal sectional view of a conventional feeder for pig-raising.

The food-quantity adjusting member 155 is constructed such that as shown in FIGS. 12 to 14, a disk-like portion 155b is secured to the lower end of a conical portion 155a. The upper end of the conical portion 155a is smaller in diameter than the food outlet 144b, is gradually enlarged in diameter downward, and the lower end thereof is slightly larger in diameter than the food outlet 144b. The disk-like portion 155b is larger in diameter than the lower end of the conical portion 155a.

Further, U-shaped abutment members 156, 156 are secured to the peripheral surface of the disk-like portion 155b with the lower ends thereof opposed.

The feeder for pig-raising 141 according to the present invention is constructed as described above. The food a within the feeding tank 144 flows along the inclined peripheral surface of the conical portion 155a of the food-quantity adjusting member 155, is smoothly discharged from a gap between the food outlet 144b and the inclined peripheral surface of the conical portion 155a, and is loaded in a suitable quantity on the disk-like portion 155b.

When the pig thrusts its nose or mouth into the bottom plate 145 and presses its nose or mouth against the disk-like portion 155b of the food-quantity adjusting member 155 to apply a force, as shown in FIG. 14, the food-quantity adjusting member 155 swings in all directions and rotates. Accordingly, the food a within the feeding tank 144 is smoothly discharged and is loaded in a suitable quantity on the disk-like portion 155b and drops into the bottom plate 145.

The food-quantity adjusting member 155 swings in all directions and rotates and the rings 153 and 154 also swing in all directions and rotate to stir the food a in the feeding tank 144. Further, the rod-like portions 156a, 156a of the abutment member 156 impact the abutment pin 146 to vibrate the lower end of the feeding tank 144 efficiently. Accordingly, even if the food a is powdery, it will not be bridge-like.

Other operations and effects of the food-quantity adjusting member 155 and those of the position adjusting member 148 are similar to those of the feeder for pig-raising 101 shown in FIG. 5.

According to the feeders for pig-raising 101, 121, and 141 of the present invention, since the food-quantity adjusting member and the rings swing in all directions and rotate to stir the food within the feeding tank, the food within the feeding tank will not be bridge-like, and the food within the feeding tank is smoothly discharged from the gap between the food outlet and the inclined peripheral surface of the conical portion.

Accordingly, the discharge condition of food is not worsened in a short period of time. Further, the food is not clogged or drips at the food outlet, and a fixed quantity of food can be discharged in a good condition at all time.

Further, according to the feeder for pig-raising 121 in which the impact members having the impact body fixed to the extreme end of the support rod are erected, the food-quantity adjusting member, the rings and the impact members swing in all directions and rotate to stir food within the feeding tank, and the impact bodies impact the inner wall surface of the feeding tank to vibrate the feeding tank. Thereby, even if food is powdery, it will not be bridge-like.

Moreover, according to the feeder for pig-raising 141 in which the abutment pins are projected on the outer peripheral surface of the lower end of the feeding tank and the abutment members are secured to the peripheral surface of the food-quantity adjusting member, the abutment members impact the abutment pins to vibrate the lower end of the feeding tank efficiently. Thereby, even if food is powdery, it will not be bridge-like.

Feeding is carried out at the disk-like portion and the bottom plate. As the food on the disk-like portion reduces, the food within the feeding tank 6 is successively discharged by its own weight. When the food on the disk-like portion or within the bottom plate is gone, the pig looks for the food on the disk-like portion with the sense of smell, and therefore the pig presses its nose or mouth against the disk-like portion to let the food discharge from the feeding tank, thus enabling efficient feeding at all time.

Since the discharge flow rate of the food from the gap between the food outlet of the circular tubular body and the inclined peripheral surface of the conical portion is reduced to the pressure of the food loaded in a suitable quantity on the disk-like portion, the discharge quantity of the food a can be adjusted relatively simply without making a fine adjustment.

The feeder for pig-raising according to the present invention requires no special members except the suspension rod, the rings and the food-quantity radjusting member and is extremely simple in construction, and therefore is less cost and failure or trouble thereof is hard to occur.

What is claimed is:

1. A feeder for pig-raising comprising:
   a feeding tank with a food outlet formed at a lower end thereof,
   a suspension rod suspended within said feeding tank,
   a food-quantity adjusting member comprising a conical portion having an upper end smaller in diameter than the food outlet of said feeding tank, being gradually enlarged in diameter downward, and a lower end slightly larger in diameter than the food outlet, and a disk-like portion secured to the lower end of said conical portion, said food-quantity adjusting member being disposed below said suspension rod, and
   a bottom plate, wherein a gap exists between said food-quantity adjusting member and said bottom plate, food being supplied to said bottom plate from a gap between the food outlet of said feeding tank and an inclined peripheral surface of said food-quantity adjusting member.

2. The feeder for pig-raising according to claim 1, wherein said suspension rod is suspended free to swing and rotate on the upper end of said feeding tank.

3. The feeder for pig-raising according to claim 2, wherein said feeding tank is in the form of a circular pipe.

4. The feeder for pig-raising according to claim 2, wherein the upper end of said suspension rod is threadedly engaged with a support plate mounted on the upper end of said feeding tank, and the suspension rod is moved up and down to render adjustable the gap between the food outlet of the feeding tank and the inclined peripheral surface of the food-quantity adjusting member.

5. The feeder for pig-raising according to claim 4, wherein two contact pins are secured to said suspension rod at a fixed angle in a horizontal direction, a stop pin is hung on said support plate movably up and down, and said contact pins come in contact with said stop pin to render said food-quantity adjusting member rotatable at a fixed angle.

6. The feeder for pig-raising according to claim 1, wherein the upper end of a ring is stopped at the lower end of said suspension rod, and said food-quantity adjusting member is connected to the lower end of said ring.

7. The feeder for pig-raising according to claim 6, wherein said food-quantity adjusting member is constructed such that an impact member having an impact body fixed to an extreme end of a support rod is erected on the upper end of the conical portion.

8. The feeder for pig-raising according to claim 6, wherein an abutment pin is projected on an outer peripheral surface of the lower end of said feeding tank, and an abutment member is secured to the peripheral surface of the disk-like portion of said food-quantity adjusting member.

9. The feeder for pig-raising according to claim 6, wherein a male thread portion of a position adjusting member is inserted into an insert hole of a support member mounted on the upper end of said feeding tank, said male thread portion is threadedly engaged with a female thread portion formed in the upper end of said suspension rod, and said suspension rod is moved up and down to render adjustable the gap between the food outlet of the feeding tank and the inclined peripheral surface of the food-quantity adjusting member.

\* \* \* \* \*